J. E. WOOD, DEC'D.
F. A. WOOD, ADMINISTRATRIX.
CORN HARVESTER.
APPLICATION FILED DEC. 20, 1913.

1,131,586.

Patented Mar. 9, 1915.
2 SHEETS—SHEET 1.

Flora A. Wood,
Administratrix of the
Estate of James E. Wood,
(Deceased.) INVENTOR, WITNESSES
Howard D. Orr
F. T. Chapman BY E. G. Siggers
ATTORNEY J. E. WOOD, DEC'D.
F. A. WOOD, ADMINISTRATRIX.
CORN HARVESTER.
APPLICATION FILED DEC. 20, 1913.
1,131,586.
Patented Mar. 9, 1915.
2 SHEETS—SHEET 2.
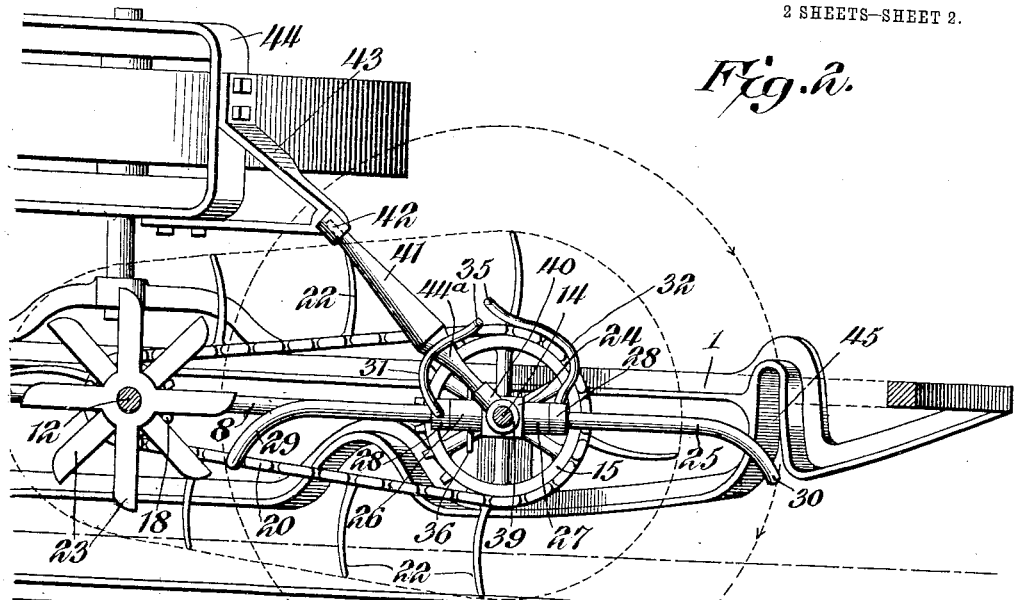
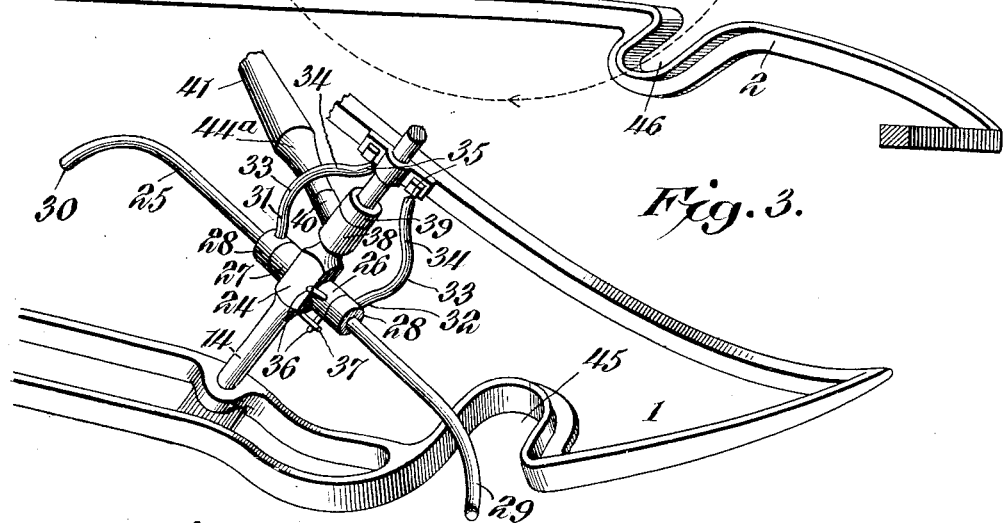
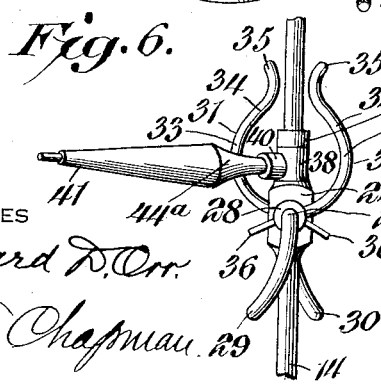
Flora A. Wood
Administratrix of the
Estate of James E. Wood,
(Deceased,) INVENTOR
WITNESSES
Howard D. Orr.
F. T. Chapman.
BY
E. G. Siggers
ATTORNEY

UNITED STATES PATENT OFFICE.

JAMES E. WOOD, DECEASED, LATE OF AURORA, ILLINOIS, BY FLORA A. WOOD, ADMINISTRATRIX, OF AURORA, ILLINOIS, ASSIGNOR OF FORTY-SIX AND ONE-THIRD ONE-HUNDREDTHS TO CHARLES A. LOVE, OF AURORA, ILLINOIS.

CORN-HARVESTER.

1,131,586.  Specification of Letters Patent.  Patented Mar. 9, 1915.

Application filed December 20, 1913. Serial No. 807,990.

*To all whom it may concern:*

Be it known that I, FLORA A. WOOD, a citizen of the United States, residing at Aurora, county of Kane, State of Illinois, administratrix of the estate of JAMES E. WOOD, deceased, late a citizen of the United States and a resident of Aurora, in the county of Kane and State of Illinois, as by reference to the duly-certified copy of letters of administration of record in the Patent Office will more fully appear, do hereby declare that the said JAMES E. WOOD invented a new and useful Improvement in Corn-Harvesters, of which the following is a specification.

This invention has reference to improvements in corn harvesters, and has to do more particularly with means for lifting fallen corn and directing it to the snapping rollers or other mechanism.

In accordance with the present invention there is provided a rotatable member movable in such relation to fallen stalks of corn that as the machine moves along the field the fallen stalks are caught, elevated, and presented to the snapping rollers in proper position to be acted upon by the snapping rollers, and this without liability of winding the stalks or parts of them upon the lifting mechanism or in any way interfering with the proper operation of the machine. Associated with the lifting mechanism are certain other devices for causing the proper operation of the lifting mechanism to bring about the results desired.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

Figure 1:
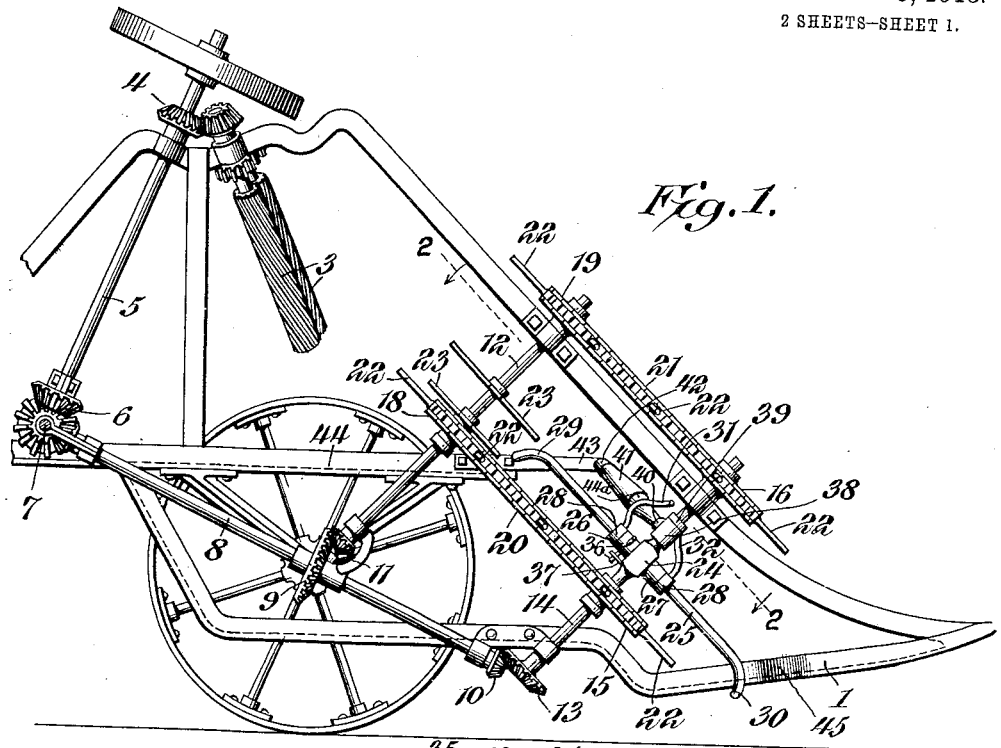
Figure 4:
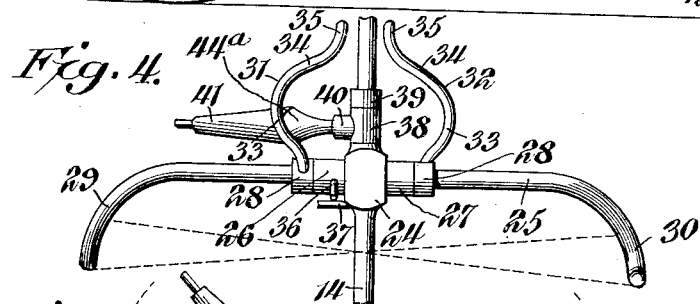
Figure 5:
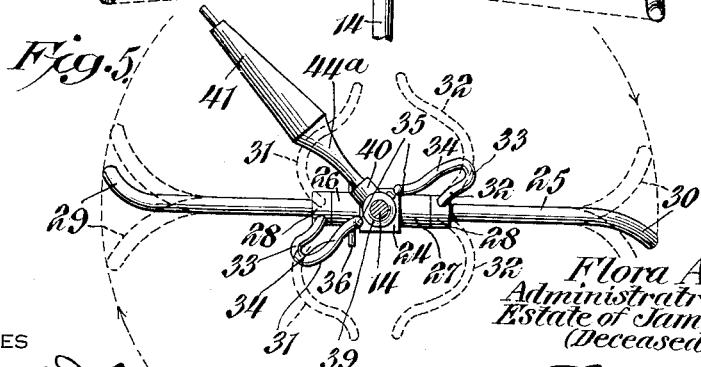

In the drawings:—Figure 1 is an elevation of the lifting side of the machine, certain of the parts of the machine being omitted, and other parts being shown in section. Fig. 2 is a section on the line 2—2 of Fig. 1 and showing some parts omitted from Fig. 1. Fig. 3 is a detailed perspective view of the elevating device for the fallen corn stalks and the gathering arm in which it is mounted. Fig. 4 is an elevation of a portion of the gathering mechanism illustrating a phase of its operation. Fig. 5 is a view of the structure of Fig. 4 looking along the axis of rotation and showing certain phases of operation in dotted lines. Fig. 6 is an elevation of the structure of Fig. 4 showing a somewhat different position of the parts.

Referring to the drawings, there are shown two gathering arms 1, 2 in comparatively close relation and diverging toward one end which constitutes the front or receiving end, and these arms are designed to direct stalks of corn entering between them to snapping rollers 3, the latter being driven by suitable gearing 4 receiving motion from a shaft 5 in turn actuated by gearing 6 receiving motion from a shaft 7 which may be considered the drive shaft of the machine and which may in turn be actuated by a suitable connection to a master wheel as is customary, for which reason the master wheel is not shown in the drawing. The gearing 6 also drives another shaft 8 having pinions 9 and 10 thereon. The pinion 9 is in mesh with another pinion 11 on one end of a shaft 12 extending upwardly from the pinion 11 at a forward angle. The pinion 10 is in mesh with another pinion 13 on the lower end of a shaft 14 extending upwardly from the pinion at a forward angle and substantially parallel with the shaft 12, and these two shafts 12 and 14 have bearings in the gatherer 1 which is suitably constructed for the purpose.

Mounted on the shaft 14 are two spaced sprocket wheels 15, 16, respectively, and similarly located on the shaft 12 are other sprocket wheels 18, 19, respectively, these two sets of sprocket wheels carrying sprocket chains 20 and 21, respectively, the chains each being provided with a suitable number of outstanding fingers 22. The sprocket wheels 18 and 19 are mounted on the shaft 12 to turn loosely thereon, but tight on the shaft are sets of radial arms 23. Since the shafts 12 and 14 incline forwardly to both the vertical and horizontal, the particular showing of inclination approximating forty-five degrees, the chains 20 and 21 and also the arms 23 have a similar inclination and the fingers 22 carried by the chains 20 and 21, as well as the arms 23, are designed to engage stalks of corn directed to them and propel these stalks of corn toward the snapping rollers 3 for action thereby.

The shaft 14 is, in the particular structure shown, provided about midway of its length with a hub or enlargement 24, and traversing this hub in a direction substantially perpendicular to the length of the shaft is a rod 25 projecting to substantially equal extents on both sides of the hub. Fast to the rod 25 on opposite sides of the hub are collars 26, 27, respectively, and at the outer ends of these collars are other collars 28 also fast to the rod 25. It will be understood, however, that each collar 26 and its companion collar 28 may be in the form of a single collar. The outer ends of the rod 25 are bent toward the same side of the longitudinal center line or axis of the rod and at the same time one end is bent in a direction opposite to that of the other, so that each end indicated at 29 or 30, respectively, is bent into a compound curve with both ends on the same side of a plane extending lengthwise of the rod and on opposite sides of a plane also extending lengthwise of the rod and perpendicular to the first plane.

Projecting from the respective collars 28 are fingers 31 and 32, these fingers being located on opposite sides of the hub 24 and shaft 14 and each finger is in the form of a compound curve having one portion 33 curved away from the shaft 14 and another portion 34 curved toward the shaft 14 and having a terminal portion 35 reverse in curvature to the portion 34 and, moreover, these fingers project in a generally radial direction from the collars 28 and are displaced about the rod 25 in approximately ninety degree relation one to the other, and their curvature is in opposition one to the other.

One of the collars, say, the collar 26, has pins 36 projecting therefrom while on the hub 24 there is another pin 37 so disposed as to be in the path of the pins 36, so that the rod 25, which is mounted to turn about its longitudinal axis in the hub 24, has but a limited rocking movement determined by the spacing of the pins 36 and their engagement with the intermediate stop pin 37.

Adjacent to the hub 24 there is a sleeve 38 surrounding the shaft 14 and located between the hub 24 and a collar 39 fast on the shaft 14. Mounted at one end in a bearing 40 projecting radially from the sleeve 38 is a roller 41 and the other end of this roller has a bearing 42 in a bracket 43 made fast to a portion 44 of the frame of the machine. The roller is formed adjacent to the bearing 40 with a conical portion $44^a$ tapering toward the bearing 40, and the roller 41 may taper from the wide or basic end of the conical portion $44^a$ toward the bearing 42. The roller 41 is so located as to be in the path of the fingers 31 and 32 for a purpose which will presently appear.

The gatherer arms 1 and 2 have inset portions 45 and 46, respectively, through which the rod ends 29 and 30 may travel, these rod ends constituting lifting members for fallen corn stalks, as will hereinafter appear.

Assuming that the machine is moving in a proper direction, which is toward the right as viewed in Figs. 1 and 2, and that the shaft 14 is being rotated in a clockwise direction, as viewed in Fig. 2, the shaft 12 having the same direction of movement, the lifting arm 25 has a rotative movement with the shaft 14 about an inclined axis, the inclination of the axis of rotation being forwardly or in the direction of travel of the machine. As the shaft 14 rotates the gathering or lifting ends 29 and 30 of the rod 25 are carried into the inset portion 45 of the gatherer arm 1 in a direction toward the ground over which the machine is passing, and then in traversing relation to the space between the gathering arms 1 and 2 and upwardly through the insert 46. During this movement one of the fingers, say, the finger 31, is brought into engagement with the conical part $44^a$ of the roller 41 and the reaction of the curved part 33 of the finger 31 and the conical part $44^a$ of the roller 41 causes a rocking movement of the rod 25 through an arc moving the then uppermost end of the rod 25 so that it is to an extent dependent and the then lower end of the rod 25 is also moved to a similarly dependent position, so that as it enters the inset portion 45 it points almost directly toward the ground and sweeps through the space between the gathering arms 1 and 2 in a manner to engage under any stalks of corn that may be down and as the end of the rod 25 now under consideration passes across the space between the gathering arms 1 and 2 the stalks are lifted and rest in the hook-shaped end of the rod 25 then moving across such space. This lifting action continues with the lifted stalk directed by the gathering arms 1 and 2 toward the fingers 22 of the chains 20 and 21, in which position the stalks are supported. In the meantime, however, the finger 31 or 32, as the case may be, but then uppermost engages the roller 41 and causes a rocking of the rod 25 to rock the latter so that the active hook end no longer underrides the stalk, but moves into more or less trailing relation thereto and is turned downwardly, thus releasing the stalk as it is caught by the fingers 22 and directed to the snapping rollers. Because of the forwardly inclined axis of rotation of the rod 25 constituting the corn stalk lifting member, the curved ends 29 and 30 thereof travel across the receiving portion or throat between the two gathering members 1 and 2 close to the ground over which the machine travels, and then have a rising rearward movement about the axis of rotation of the shaft 14, the lifting member 25 in the meantime having imparted thereto a rocking movement on its longitudinal axis causing the then active lifting end 29 or 30, as the case may be, to turn downwardly and to a certain extent forwardly with respect to the direction of travel of the said end to thereby escape from the lifted stalks already caught by the fingers 22 and at approximately the point where they are caught by the fingers 23, which latter are mounted on the shaft 12 rotating more rapidly than the shaft 14 and consequently carry the stalks out of the path of the lifting device 25.

While the lifting device 25 rotates bodily about the axis of the shaft 14 it also has a rocking movement on its own longitudinal axis due to the engagement of the fingers 31 and 32 in succession with the roller 41 and as these fingers are oppositely directed with respect to the longitudinal axis of the lifting member 25 the latter has imparted to it the rocking movement described. The roller 41 rotates on its bearings as it is engaged by the fingers 31 and 32, so that friction between these fingers and the roller is reduced to a minimum.

While the lifting device has been described as a part of a corn harvester, it will be understood that there are features of the structure which may be used in other connections, and hence the use of the structure is not of necessity confined to corn harvesters.

What is claimed is:—

1. In a structure for the purpose described, an elongated rotatable member rockable about its longitudinal axis and having its axis of rotation inclined to the vertical and perpendicular to said longitudinal axis.

2. In a structure for the purpose described, a rotatable member having its axis of rotation inclined to the vertical and said member being extended perpendicular to the axis of rotation, said rotatable member being also mounted for rocking movements about its longitudinal axis, and said elongated rotatable member having its terminal portions both on one side of the axis of rotation and directed oppositely with respect one to the other.

3. In a structure for the purpose described, a rotatable member having its axis of rotation inclined to the vertical and said member being extended perpendicular to the axis of rotation, said rotatable member being also mounted for rocking movements about its longitudinal axis, and said elongated rotatable member having its terminal portions both on one side of the axis of rotation and directed oppositely with respect one to the other, said rotatable rocking member also being provided with operating fingers on opposite sides of its axis of rotation, and a relatively fixed member in the path of the fingers for engaging them in succession as the member rotates to cause the rocking movements thereof.

4. In a corn harvester, a lifting member for fallen stalks of corn comprising a shaft mounted in the harvester structure at a forwardly inclined angle, means for rotating the shaft, an elongated member mounted on the shaft with its longitudinal axis perpendicular to the axis of rotation of the shaft, said elongated member having oppositely directed terminal portions both projecting from one side of the longitudinal axis of the elongated member, actuating fingers mounted on the elongated member on opposite sides of its axis of rotation, and a relatively fixed member in the path of the fingers in position to be engaged in succession by the fingers to cause the rocking of the elongated member on its longitudinal axis.

5. In a corn harvester, a lifting member for fallen stalks of corn, comprising a shaft mounted in the harvester structure at a forwardly inclined angle, means for rotating the shaft, an elongated member mounted on the shaft with its longitudinal axis perpendicular to the axis of rotation of the shaft, said elongated member having oppositely directed terminal portions both projecting from one side of the longitudinal axis of the elongated member, actuating fingers mounted on the elongated member on opposite sides of its axis of rotation, and a relatively fixed member in the path of the fingers in position to be engaged in succession by the fingers to cause the rocking of the elongated member on its longitudinal axis, the relatively fixed member being in the form of a roller with a conical engaging portion for the fingers, and said fingers being curved with relation to the conical portion of the roller to cause the fingers to have a rolling engagement with the roller.

6. In a corn harvester, an elongated and effectively one-piece rotatable member rockable about its longitudinal axis with the latter perpendicular to the axis of rotation and also having the axis of rotation inclined forwardly with respect to the direction of travel of the corn harvester, the rockable portion of the rotatable member extending on opposite sides of its axis of rotation and having terminal portions positioned to move close to the ground when the machine is in operation during a portion of the movement of rotation and to rise from such position and move rearwardly during another portion of the movement of rotation.

7. In a corn harvester, an elongated rockable member, a supporting shaft therefor in which the member is mounted for rocking, said shaft being mounted for rotation on an axis forwardly inclined with respect to the active direction of movement of the corn harvester, said elongated rockable member having the ends curved toward the same side of its longitudinal axis and also in relatively opposite directions, and means for causing a rocking of the rockable member during predetermined periods of the rotation thereof upon the inclined axis.

8. In a corn harvester, gathering members, an inclined shaft carried by one of the gathering members, an elongated rockable member intermediately mounted in the shaft for rocking movements, and having its ends curved in opposite directions on the same side of the axis of rocking, and means for causing the rocking movements to bring the ends of the rockable member into active relation to fallen corn stalks to lift them.

9. In a corn harvester, gathering members, an inclined shaft carried by one of the gathering members, an elongated rockable member intermediately mounted in the shaft for rocking movements, and having its ends curved in opposite directions on the same side of the axis of rocking, and means for causing the rocking movements to bring the ends of the rockable member into active relation to fallen corn stalks to lift them, said lifting device having corn stalk engaging structures associated therewith for receiving the corn stalks after being lifted.

10. In a corn harvester, an inclined shaft having means for driving it, a rod mounted in the shaft intermediately of the length of the rod and rockable in its mounting, said rod having the opposite ends bent toward the same side of the axis of rocking and in opposite directions with respect one to the other, bent fingers on the rod on opposite sides of the shaft, and a roller having a relatively fixed position and arranged in the path of the fingers to engage them and cause a rocking of the rockable member.

11. In a corn harvester, an inclined shaft having means for driving it, a rod mounted in the shaft intermediately of the length of the rod and rockable in its mounting, said rod having the opposite ends bent toward the same side of the axis of rocking and in opposite directions with respect one to the other, bent fingers on the rod on opposite sides of the shaft, and a roller having a relatively fixed position and arranged in the path of the fingers to engage them and cause a rocking of the rockable member, said roller where engaged by the finger being of conical form with the apex of the cone directed toward the shaft.

12. In a corn harvester, an inclined rotatable shaft, a rockable member in the form of a rod traversing the shaft and rotatable therewith, said rod having its ends bent toward the same side of the longitudinal axis of the rod and in opposite directions one with respect to the other, fingers on the rod on opposite sides of the shaft, a roller in the path of the fingers to cause rocking movements of the rod, corn stalk engaging fingers propelled by the shaft to receive corn stalks engaged by the rod and delivered thereto, and corn stalk engaging means receiving the stalks from the fingers and actuating them at a more rapid rate than the fingers.

13. In a corn harvester, lifting means for fallen corn stalks comprising a rod having the ends oppositely bent on the same side of the longitudinal axis of the rod, and said rod being provided with a carrying shaft rotatable on an axis inclined to the vertical to bring the ends of the rod close to the ground and to carry them to a high point away from the ground, and means for causing a rocking of the rod to bring the ends into engaging and releasing relation to corn stalks at different positions of rotation of the lifting device.

14. In a corn harvester, gathering means, and lifting means for fallen corn stalks, the last-named means comprising an elongated member rockable about its longitudinal axis and mounted for rotation about an axis substantially perpendicular to its longitudinal axis and forwardly inclined with reference to the direction of travel of the machine, said elongated member being positioned to have a low movement close to the ground and transverse to the gathering members, and from thence to move upwardly and rearwardly.

15. In a corn harvester, gathering means, and lifting means for fallen corn stalks, comprising a member associated with the gathering means and rotatable on a forwardly inclined axis, said member having a terminal portion remote from the axis of rotation bent out of the longitudinal center line of said member, and said member being of a length to cause its bent terminal portion to move transversely of the gathering means close to the ground and from thence to move rearwardly and upwardly, and said member being mounted for rocking movement on an axis coinciding with its longitudinal center line to cause the bent terminal portion to move into trailing relation to the lifted corn stalk when moving rearwardly and upwardly.

In testimony, that I claim the foregoing is the invention of JAMES E. WOOD, I have hereto affixed my signature in the presence of two witnesses.

FLORA WOOD,
*Administratrix of the estate of James E. Wood, deceased.*

Witnesses:
IDA COHEN,
CHAS E. DAY.

Copies of this patent may be obtained for five cents each, by addressing the "Commissioner of Patents, Washington, D. C."